Sept. 6, 1932.  E. M. McNALLY  1,875,476
REMOVABLE HEAD TOOTHBRUSH
Filed Feb. 10, 1931
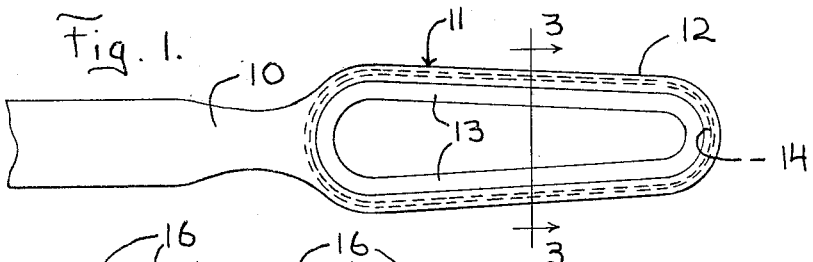
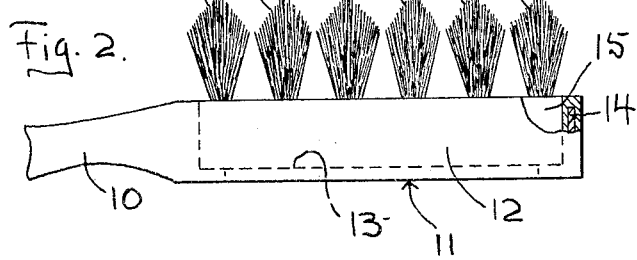
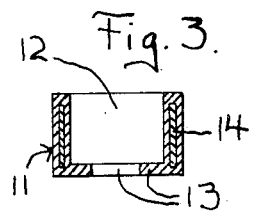
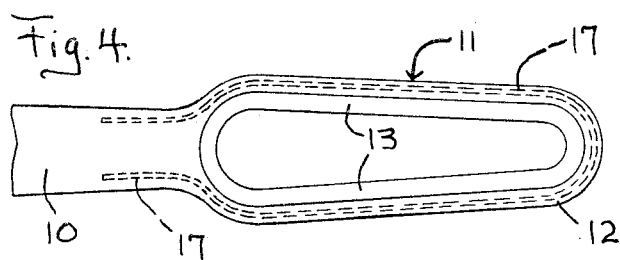
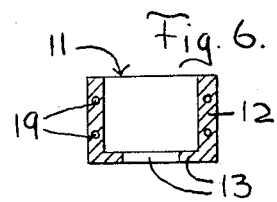
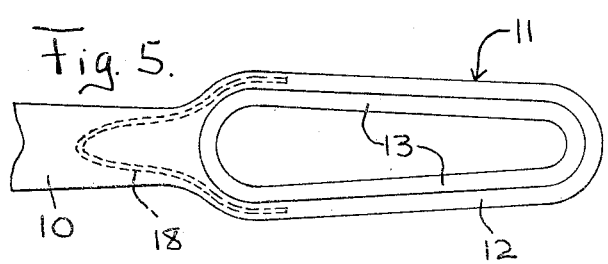
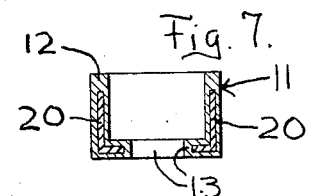
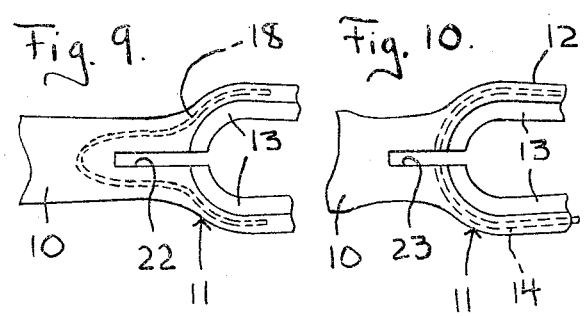
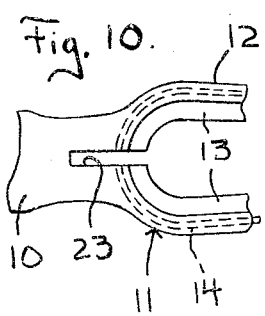
Inventor,—
Edwin M. McNally,
By Fricke + DeBusk,
Attorneys.

Patented Sept. 6, 1932

1,875,476

UNITED STATES PATENT OFFICE

EDWIN M. McNALLY, OF INDIANAPOLIS, INDIANA, ASSIGNOR TO THE TEFRA CO., OF INDIANAPOLIS, INDIANA, A CORPORATION OF DELAWARE

REMOVABLE HEAD TOOTHBRUSH

Application filed February 10, 1931. Serial No. 514,803.

My invention relates to removable head toothbrushes of a type comprising a handle provided with a loop at one end in which a brush head is mounted so as to be gripped tightly thereby but so as to be removable therefrom whenever it is desired to substitute one brush head for another, and it is the object of my invention to provide a new and improved form and arrangement of parts in which a handle made of a comparatively soft insulating material may be reenforced and strengthened so as to have the desired grip on the brush head. To this end, it is one of the objects of my invention to provide an improved arrangement of metal reenforcing means about which the handle and loop material is molded, each such reenforcing means being kept of sufficiently small size with respect to the size of the molded part in which it is imbedded so as to insure that the molded part may function as a structural unit without having to rely entirely upon the reenforcement for the required strength.

It is one of the objects of my invention to provide improved forms of reenforcing parts with respect to the particular portions of the loop and handle for which reenforcement is to be provided so as to insure the desired cooperation with the other parts of the structure. It is another object of my invention to provide reenforcing parts of such form and disposition as to permit the provision of a slot at the handle end of the loop if desired without in any way affecting the operation or function of the reenforcing part.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a front face view of a handle and loop embodying my improved construction, with the handle broken away at one end;

Fig. 2 is a side view of the loop and handle as shown in Fig. 1, but with a brush head in position therein, a part of the material being broken away for clearness of illustration;

Fig. 3 is a vertical cross section taken at line 3—3 of Fig. 1;

Figs. 4 and 5 are views similar to Fig. 1 but showing modified forms of construction;

Figs. 6 and 7 are cross sectional views similar to Fig. 3 but showing modified forms of reenforcing means in use therein;

Fig. 8 is a view of the outer end portion of the loop of a modified construction employing the form of reenforcing means as shown in Fig. 7.

Fig. 9 is a fragmentary view similar to a portion of Fig. 5 but showing a slightly modified construction comprising a slot in the handle and opening into the loop; and Fig. 10 is a fragmentary view similar to a portion of Fig. 8 but showing the use of a slot in the handle in the form of device as shown in Fig. 1.

Referring now to Figs. 1, 2 and 3, in which corresponding parts are indicated by the same reference characters, 10 indicates a handle in the form of a molding of pyroxyline or other material which is comparatively soft in its molded form, such handle having a loop 11 formed integrally therewith at one end of the handle, such loop 11 comprising a band portion 12 and an inwardly extending flange portion 13. In the construction shown in Fig. 1, the band portion 12 of the loop is reenforced by means of a metal band 14 which in the construction shown is in annular form, being completely encased in the molding material forming the principal portion of the loop. The band 14 in the construction shown is in the form of a piece of comparatively stiff resilient metal which has a very considerable strength lineally so as to resist any possible stretching of the band as a whole, and which has more or less strength serving to resist distortion of the loop transversely. In Fig. 2, I have shown a brush head 15 in position in the loop resting upon the annular flange 13, such brush head 15 being provided with a plurality of tufts 16 of bristles suitably secured in position therein. The brush head 15 may be formed of metal or of any other desired material of such strength and stiffness as to maintain its shape so as to have a tight gripping relationship with the loop 11. The arrangement of the metal band 14 is such that the molding material making up the loop band 12 about the metal band is adapted to function as a structural shape having a very considerable strength and stiffness without having to rely entirely upon the strength and stiffness of the reenforcing metal band imbedded therein.

In the construction shown in Fig. 4, a reenforcing member 17 is employed in the form of a comparatively stiff resilient metal bow opening toward the handle 10 with its arms extended along the sides of the loop and beyond the end of the loop along the sides of the handle. The arrangement is such that the arms of the bow serve to oppose outward movement of one side of the loop away from the opposite side of the loop.

In Fig. 5, I have shown a somewhat similar construction, employing a bow 18 made of a comparatively stiff resilient strip of metal, having the arms of the bow diverging toward the loop. In the arrangement shown in Fig. 5, the arms of the loop extend along the side portions of the handle adjacent to the end of the loop and continue for a limited distance along the sides of the loop, serving in substantially the same capacity as is above described in connection with the bow member 17 of Fig. 4.

I have shown the band 14 and the bow or band members 17 and 18 in the form of thin strips of sheet metal on edge so as to yield transversely of the loop. The reenforcing members may alternatively be in the form of stiff wires 19 as shown in Fig. 6, any desired number of turns of the wire being employed, or they may be in the form of angles or other suitable structural shapes if desired. In Fig. 7 I have shown a reenforcing member 20 in the form of an angle having a portion imbedded in the band member 12 of the loop and another portion imbedded in the flange 13.

In Fig. 8 I have shown a construction employing an angular reenforcing member 20 as shown in Fig. 7, but with a slot 21 across the loop at its outer end. The use of the slot 21 provides for any necessary expansion for taking care of irregularities in the size or shape of the brush head, while at the same time the reenforcing member assures the desired strength of gripping.

While I employ in some cases a closed loop as shown in Figs. 1, 4 and 5, and in other cases open the loop at its outer end as shown in Fig. 8, I am not necessarily limited to such forms, since in some instances it might be preferable to employ a form of construction such as is shown in Figs. 9 or 10. Fig. 9 is substantially the same as Fig. 5 but with a slot 22 employed therein longitudinally of the handle 10 and opening at one end into the loop 11, such slot being employed without in any way affecting the operation of the reenforcing bow 18. A similar slot 23 is employed in the construction shown in Fig. 10, the construction of said Fig. 10 being except for the slot the same as that shown in Fig. 1. Even though the slot 23 is cut through the reenforcing band 14, it will be understood that the reenforcing band has a very considerable strengthening effect upon the end portions of the loop at opposite sides of the slot 23, since the stiffness of the band 14 as encased in the molding material is sufficient for quite strongly resisting any movement of the portion at one side of the loop away from the portion at the opposite side.

By my construction, I have provided a handle member adapted very strongly to grip a brush head of suitable size and shape. In cases where the size of the brush head is likely to vary to any appreciable degree, a slot may be employed for pemitting the required amount of yielding so as to prevent breakage of the loop when the brush head is pressed into position. The arrangement is such, however, in all the forms shown that the brush head is held firmly in position in the loop so as to prevent accidental dislodgement of the brush head in use.

While I prefer to employ the form of device as shown in my drawing and as above described, it is to be understood that my invention is not limited thereto, except so far as the claims may be so limited by the prior art.

I claim:—

1. In a toothbrush, the combination of a handle, a loop at one end of the handle formed integrally with the handle, and a brush head mounted in said loop, said loop and handle being in the form of a molding of non-metallic material and said loop being provided with a reenforcing metallic bow substantially completely surrounded on both its inner and its outer faces by said material and extending across one end of the loop and along the adjacent portions of the sides of the loop serving to press the side portions of the loop into firm gripping relationship to the side portions of the brush head.

2. In a toothbrush, the combination of a handle, a loop at one end of the handle formed integrally with the handle, and a brush head mounted in said loop, said loop and handle being in the form of a molding of non-metallic material and said loop being provided with a reenforcing metallic member extending completely about the loop closely adjacent to its inner face but with said member substantially completely surrounded on both its inner and its outer faces by said material and serving to press the side portions of the loop into firm gripping relationship to the side portions of the brush head.

3. In a toothbrush, the combination of a handle, a loop at one end of the handle formed integrally with the handle, and a brush head mounted in said loop, said loop and handle being in the form of a molding of non-metallic material and said loop being provided with a reenforcing bow of comparatively stiff resilient metal substantially completely surrounded on both its inner and its outer faces by said material and extending across one end of the loop and along the adjacent portions of the sides of the loop serving by its resiliency to resist outward movement of the side portions of the loop whereby when said side portions of the loop are displaced outwardly by the insertion of the brush head therebetween said side portions have a strong gripping engagement with said brush head.

4. In a toothbrush, the combination of a handle, a loop at one end of the handle formed integrally with the handle, and a brush head mounted in said loop, said loop and handle being in the form of a molding of non-metallic material and said loop being provided with a reenforcing metallic bow formed of comparatively stiff resilient angle bar substantially completely surrounded on both its inner and its outer faces by said material and extending across one end of the loop and along the adjacent portions of the sides of the loop serving to press the side portions of the loop into firm gripping relationship to the side portions of the brush head.

5. In a toothbrush, the combination of a handle, a loop at one end of the handle formed integrally with the handle, and a brush head mounted in said loop, said loop and handle being in the form of a molding of non-metallic material and said loop and handle being provided with a metal bow substantially completely surrounded on both its inner and its outer faces by said material and opening toward the loop with its arms extending along the sides of the handle and into the opposite side portions of the loop and serving to press said side portions of the loop into firm gripping engagement with the side portions of the brush head.

EDWIN M. McNALLY.